Patented Aug. 15, 1939

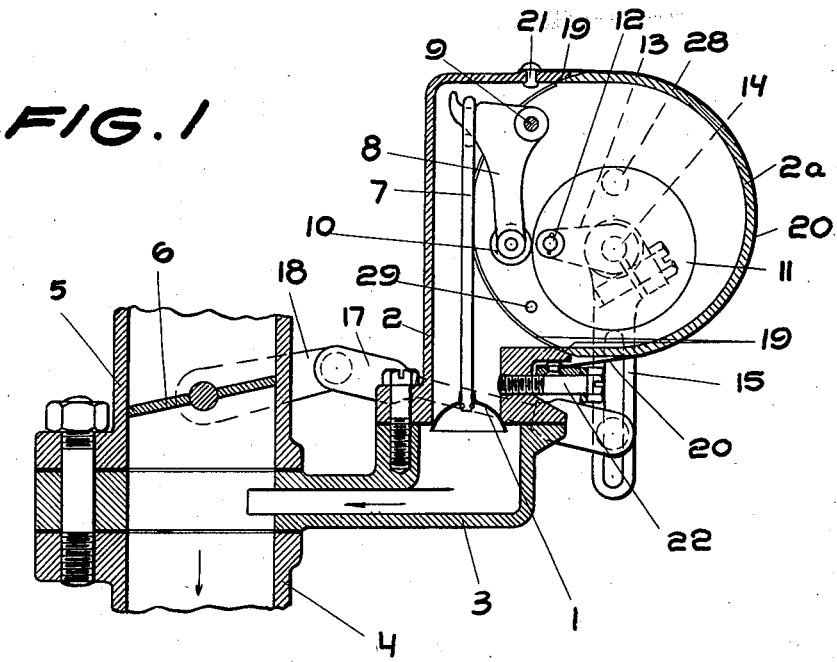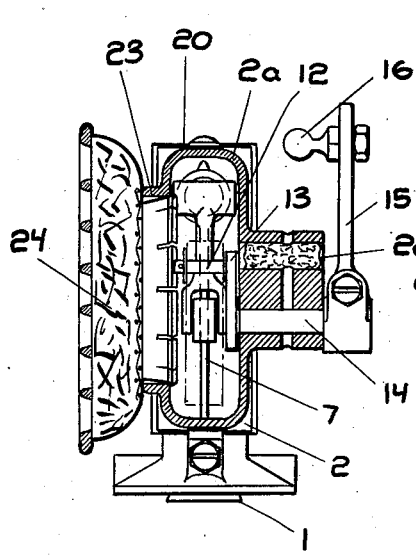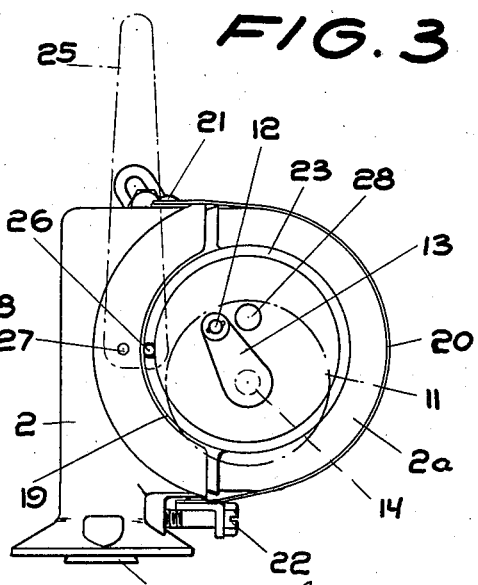

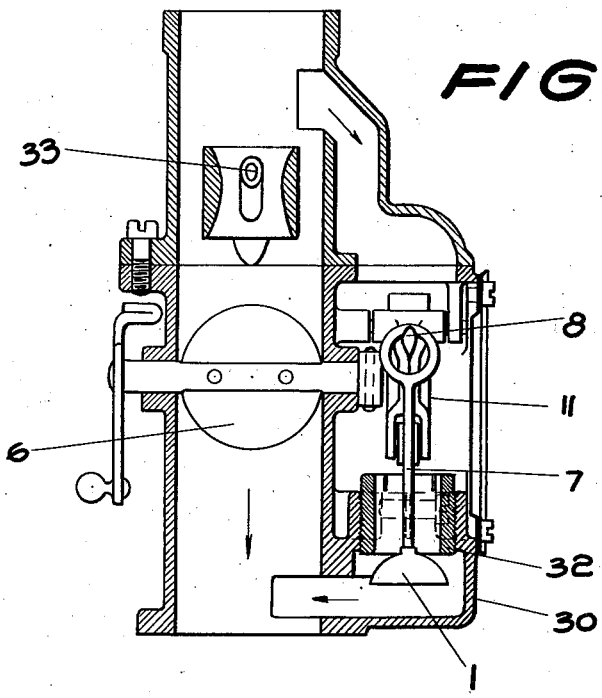
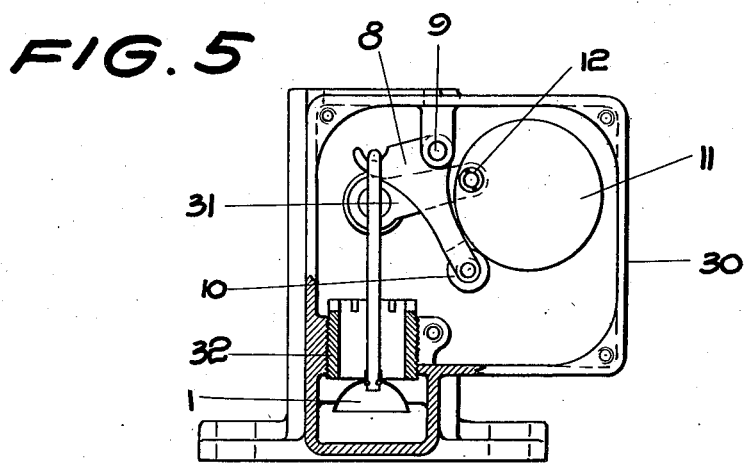

2,169,622

UNITED STATES PATENT OFFICE 2,169,622

AUXILIARY AIR CONTROLLER FOR INTERNAL COMBUSTION ENGINES

Per Axel Reinar Weiertz and Lorentz Kristian Olsson, Malmo, Sweden, assignors to Aktiebolaget Cevia, Malmo, Sweden, a corporation of Sweden Application November 16, 1938, Serial No. 240,864
In Sweden November 23, 1937

17 Claims. (Cl. 123—119)

Our present invention refers to auxiliary air controllers for internal combustion engines. In a well-known type of such controllers the induction pipe or manifold of the engine, which is provided in the ordinary manner with a main air inlet which is adjustable by means of a throttle valve for controlling the power of the engine (said throttle valve in the case of carburettor engines consisting of the ordinary gas throttle valve in the carburettor), is in addition provided with an auxiliary air inlet which is positioned behind the throttle valve and in which there is provided a control valve which opens automatically under the action of the vacuum in the induction pipe or manifold. The opening of said control valve takes place against the action of a load which is positively variable in dependence upon the adjustment of the power control throttle valve in such a manner as to cause the auxiliary air valve to move farther in its opening direction for the same increase of the vacuum in the inlet pipe at a greater than at a less opening position of the power control throttle valve.

Auxiliary air controllers have already been proposed in which said load is formed by a spring which is positively variable, in respect of its resiliency, in dependence upon the adjustment of the power control throttle valve. Such controllers, however, have the disadvantage that the spring is difficult to calculate in respect of its resiliency, because this is influenced by such hardly controllable factors as hardening, shaping, fastening etc. of the spring. Furthermore, the function of a spring is not constant but changes due to fatigue.

It is the principal object of the present invention to provide an auxiliary air controller of the type referred to in which the disadvantages of using a spring as the source of the above-mentioned load are removed. It is a further object of the invention to provide an auxiliary air controller which enables results to be obtained which were never before attained when using a spring, such as improved average saving of fuel.

With these and other objects in view it is a feature of the invention that the load on the auxiliary air valve, which load is positively variable in dependence upon the adjustment of the power control throttle valve, is derived from a movable means being effective through its gravity, more particularly a pendulum weight, which is movably suspended in relation to a movable lever resting against the same under the influence of the force acting on the auxiliary air valve in its opening direction. The suspending means consists of an arm movable in dependence upon the adjustment of the power control throttle valve, and the suspension is made in such a manner that, first, movement of this arm in a direction corresponding to a greater opening position of the power control throttle valve causes a reduction of the force with which the pendulum weight acts upon the lever resting against it, when the position of said lever is unaltered, and secondly, that the pendulum weight, when the force acting upon the auxiliary air valve in the opening direction thereof overcomes the force with which the pendulum weight acts upon the lever resting against it, yields while increasing the last mentioned force until equilibrium is attained.

The invention will be more fully described with reference to the accompanying drawings which show two embodiments of the same by way of examples. In the drawings:

Fig. 1 is a vertical section through one embodiment of the auxiliary air controller and its connection to a carburettor.

Fig. 2 is a section at right angles to that shown in Fig. 1 through the auxiliary air controller with the pendulum weight removed.

Fig. 3 shows a lateral view of the auxiliary air controller with the air cleaner and the pendulum weight removed, Figs. 4 and 5 are two vertical sections at right angles to each other through the other embodiment, where the auxiliary air controller is directly combined with a carburettor.

In the drawings, the auxiliary air valve is designated by 1. In the form shown in Figs. 1 to 3 it is mounted in a valve housing 2, which is connected through an intermediary member 3 to the induction pipe or manifold 4 of the engine adjacent to a carburettor 5 which is provided with the ordinary gas throttle valve 6. The valve 1 is suspended by means of a rod 7, attached to the same and provided with an eyelet at its upper end, on a hooked arm of a bell crank lever 8, which is fulcrummed on a pivot 9 and at the end of its other arm is provided with a roller 10 by means of which it engages a pendulum weight 11. In Fig. 3 this pendulum weight is indicated by dot and dash lines. It has the form of a circular disk, which is suspended at an eccentric point by means of a pin 12 parallel to the axis of the disk on an arm 13 which is secured to an axle 14 journaled in a removable part 2a of the housing 2. To that end of the axle 14 which projects from the housing is secured an arm 15, and by means of a ball pin 16, which is adjustable along a slot in said arm, and a link 17 of adjustable length and engaging said ball pin the arm 15 is connected to a further arm 18 attached to the axle of the carburettor throttle valve 6.

In Fig. 1 the throttle valve 6 and the auxiliary valve I are shown in fully closed positions. Then the roller 10 engages the edge of the pendulum disk 11 at a point situated only slightly below the suspension pin 12, so that the pendulum disk acts upon the bell crank lever 8 resting against the same with a maximal force. When the throttle valve 6 is rotated in its opening direction, the axle 14 with the arm 13 is rotated in a clockwise direction as seen in Figs. 1 and 3, and thereby the suspension pin 12 is moved upwardly and away from the roller 10, so that the force with which the pendulum disk acts upon the bell crank lever 8 resting against the same is reduced. When the throttle valve 6 has been rotated into fully open position, the arm 13 occupies for example the position shown in Fig. 3. Naturally, in whatever position within the predetermined limits the arm 13 may be, at the occurrence of a force acting on the valve I in its opening direction to overcome the force with which the pendulum disk acts upon the lever 8, the pendulum disk will yield under an increase of the latter force, until equilibrium is attained.

Not only the axle 14 but also the pivot 9 carrying the lever 8 is supported by the removable part 2a of the housing 2. Joints 19 between this and the removable part 2a run along circular surfaces of revolution (cylinder surfaces) which have their axis parallel to the axle 14 and the pin 12, so that the removable part 2a is adjustable in relation to the housing 2 about this axis. The removable part 2a, which is preferably formed with an approximately semi-cylindrical circumferential wall and full circular sides, is held in position by means of a strapping band 20 applied around the same, one end of said band being secured to the housing 2 for example through a rivet 21, while the other end of the band is similarly secured to a lug which is capable of being tightened by a clamping screw 22 screwed into the housing 2. The removable part 2a has one of its circular side walls provided with a central opening surrounded by a collar 23, in which opening there is removably mounted an air cleaner 24, through which the auxiliary air enters the auxiliary air valve housing.

Adjustment of the auxiliary air valve for proper working is carried out by rotating the part 2a preferably by means of a special tool which is indicated through dash and dot lines at 25 in Fig. 3. This tool is in the form of a lever which has at one end on one of its sides a couple of projecting pegs with which it may be brought into engagement (with the air cleaner removed) with a notch 26 in the outer edge of the collar 23 and a notch or a hole 27 in the housing 2. By then turning this lever 25 the part 2a may readily be adjusted in a fine and sensitive manner. At this adjustment the clamping screw 22 should be loosened only so much that the part 2a is allowed to be rotated stiffly while overcoming the friction between itself and the strapping band 20 acting as a braking band. As a criterion of the correct adjustment it holds good that, when the length of the suspending arm 13 equals the distance between the centre and the suspending point of the circular pendulum weight and when the axis of rotation of the arm 13 and the centre of the weight coincide, a turning of the arm 13 within the predetermined limits, in the fully closed position of the valve I, must not cause either a raising or a lowering of the pendulum disk 11, which means that this occupies a central position in relation to the axle 14 and turns about its own centre. When after carrying out the adjustment the screw 22 is tightened to hold the part 2a firmly clamped, this does not cause any noticeable disturbance of the adjustment. Evidently, at a revision subsequent adjustment for compensating for wear may be carried out in the same manner.

For removal of the part 2a the clamping screw 22 need not be completely screwed out but only loosened so much that the strapping band 20 may be swung out laterally about its fastening rivets sufficiently to allow drawing out of the part 2a. The latter is capable of being turned over, i. e. it may be mounted with the air cleaner positioned either on the right hand or on the left hand side, according to what proves to be most convenient, with regard to the space available, at the mounting of the auxiliary air control apparatus for example in various different car motors. At such turning over the axle 14 is changed between two different journal holes provided for it in the side of the part 2a opposite the air cleaner, the hole which is free in the case shown in Figs. 1 to 3 being designated by 28 and stopped by a felt wisp preferably soaked with a lubricant. When turning over the part 2a also the pivot 9 of the lever 8 is changed between two different holes provided for the same, that which is free in the case of Figs. 1 to 3 being designated by 29 (Fig. 1).

The inertia inherent in the pendulum weight causes certain advantageous effects. When the throttle valve 6 is rapidly opened, the vacuum, under the action of which the valve I opens, does not have time to decrease as rapidly as the opening movement of the valve 6 alters the position of the arm 13 in a direction of reducing the force with which the pendulum weight acts upon the lever 8. Due to the inertia of the pendulum weight this phenomenon, however, does not cause the undesirable effect arising at the use of a spring that the valve I performs a sudden opening movement and immediately thereupon again moves in the closing direction. The inertia of the pendulum weight has besides the advantage of a smoothing action in general, so that the auxiliary air valve cannot get into vibration, which in its turn for one thing causes less wear. Furthermore, the inertia of the pendulum weight is capable of being utilized in car motors for relatively reducing the auxiliary air supply at acceleration and uphill drive and relatively increasing the auxiliary air supply at retardation and downhill drive. For this purpose it is only required to mount the auxiliary air control apparatus in such a way that it turns its removable part 2a forwardly in the driving direction.

In the form shown in Figs. 4 and 5, where the auxiliary air valve housing 30 is directly combined with the carburettor housing, the pendulum disk 11 is suspended by means of the pin 12 on an arm 31 which is directly mounted on the end of the throttle valve axle which projects into the housing 30. In Figs. 4 and 5 both the throttle valve 6 and the auxiliary air valve I are shown in fully opened position. When the throttle valve 6 is closed, the arm 31 moves counter-clockwise as seen in Fig. 5, and in the case of unaltered position of the valve I the force with which the pendulum weight 11 acts upon the lever 8 resting against the same is thereby increased. This force is also increased, when the valve 1 moves in its opening direction, while the position of the arm 31 is unaltered. The relation between this increase and the movement of the valve 1 may be adjusted by an appropriate choice of the position of the pivot 9 in relation to the axis of rotation of the arm 31 and by a proper choice of the lengths of this arm and of the arms of the lever 8, as well as, if desired, by a curved shaping of the sliding surface of the pendulum weight against the roller 10. In the form according to Figs. 4 and 5 the seat 32 for the valve 1 is made adjustable in the housing 30. This is connected with the carburettor housing at the top beyond the fuel nozzle 33 of the carburettor as well as at the bottom within the throttle valve 6. It should be mentioned that the auxiliary air control apparatus admits a simpler construction of the carburettor itself by reducing the demands on the accuracy with which the carburettor adjusts the quantity of fuel in relation to the quantity of air passing through the fuel nozzle.

It will be understood that the invention is not limited to the forms thereof here described and shown for the purpose of illustration only, since many alterations of these forms may be carried out within the scope of the invention.

What we claim and desire to secure by Letters Patent is:

1. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being adapted to be varied automatically in dependence upon the adjustment of said power control throttle valve, movable means effective by gravity for producing said load, and means for connecting said movable means with the power control throttle valve in a manner such that movement of said throttle valve in a direction of increasing opening position thereof causes a reduction of the load on said auxiliary air valve allowing said valve to move further in its opening direction for the same increase of the vacuum within said induction pipe at a greater than at a less opening position of said throttle valve.

2. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, pendulum means for producing said load, and means for connecting said pendulum means with the power control throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

3. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, pendulum means for producing said load, suspension means for said pendulum means, and means for connecting said pendulum means with the power control throttle valve in a manner such that movement of said throttle valve in a direction of increasing opening position thereof causes a reduction of the load exerted by said pendulum means on said auxiliary valve allowing said auxiliary valve to move further in its opening direction for the same increase of the vacuum within said induction pipe at a greater than at a less opening position of said throttle valve.

4. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, pendulum means for producing said load, suspension means for said pendulum means comprising an arm movable in dependence upon the adjustment of said throttle valve, means for connecting said pendulum means and said arm with the power control throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

5. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, pendulum means for producing said load, means for transmitting the load from said pendulum means to said auxiliary valve, suspension means for said pendulum means, means for connecting said pendulum means with the power control throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

6. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, pendulum means for producing said load, means for transmitting said load from said pendulum means to said auxiliary valve comprising a lever engaging said pendulum means and connected with said auxiliary valve, suspension means for said pendulum means, means for connecting said pendulum means with the power control throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

7. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, pendulum means for producing said load comprising a circular disk, means for transmitting said load from said disk to said auxiliary valve comprising a lever engaging the edge of said disk and connected with said auxiliary valve, means for suspending said disk at an eccentric point thereof allowing it to swing in its own plane, means for connecting said disk with the power control throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

8. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, a circular pendulum disk for producing said load, means for transmitting said load from said disk to said auxiliary valve comprising a bell crank lever engaging the edge of said disk with one of its arms, a rod carrying said auxiliary valve and suspended by the other arm of said lever, an arm for suspending said disk at an eccentric point thereof allowing it to swing in its own plane, means for connecting said arm with the power control throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

9. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, a pendulum disk for producing said load, a housing enclosing said auxiliary valve and said pendulum disk, means for transmitting said load from said disk to said auxiliary valve comprising a bell crank lever journaled in said housing and engaging the edge of said disk with one of its arms, a rod carrying said auxiliary valve and suspended by the other arm of said lever, an arm for suspending said disk at an eccentric point thereof allowing it to swing in its own plane, means for pivotably mounting said suspension arm in said housing, and means for connecting said suspension arm with said throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

10. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, a pendulum disk for producing said load, a bell crank lever for transmitting said load from said disk and engaging the edge of said disk with one of its arms, an arm for suspending said disk at an eccentric point thereof allowing it to swing in its own plane, the point of engagement of said bell crank lever with said disk being situated near said eccentric suspension point, when said throttle valve and said auxiliary valve are in their closed positions, and said suspension point being moved upwardly and away from the point of engagement of said lever with said disk, when said throttle valve is adjusted in a direction of a greater opening position of the same, means for connecting said suspension arm with said throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

11. In an auxiliary air controller as claimed in claim 8, the additional feature that the length of said suspension arm equals the distance between the centre and the suspension point of said circular pendulum disk.

12. In an auxiliary air controller as claimed in claim 8, the additional feature of a roller mounted on the end of the arm of said bell crank lever engaging said pendulum disk.

13. In an auxiliary air controller as claimed in claim 9, the additional feature that said means for connecting said suspension arm with said throttle valve comprises a slotted arm, a pin engaging the slot in said arm, a link carrying said pin at one end, and a crank arm rigidly connected with said throttle valve and pivotably connected with said link at the other end of the latter.

14. An auxiliary air controller of the character described, for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, a pendulum disk for producing said load, a housing enclosing said auxiliary valve and said pendulum disk, said housing comprising a removable part adjustably clamped thereto, means for transmitting said load from said pendulum disk to said auxiliary valve comprising a lever journaled in said housing and engaging the edge of said disk, an arm for suspending said disk at an eccentric point thereof allowing it to swing in its own plane said load transmitting lever and said suspension arm being mounted in the removable part of said housing, and means for connecting said suspension arm with said throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

15. In an auxiliary air controller as claimed in claim 14, the additional feature of joints between said housing and the removable part thereof and formed along circular surfaces of revolution having a common axis, the removable part being adjustable about said axis.

16. In an auxiliary air controller as claimed in claim 14, the additional feature of joints between said housing and the removable part thereof and formed along circular surfaces of revolution having a common axis, the removable part having an approximately semi-cylindrical circumferential wall and full-circular sides, a strapping band adapted to hold the said removable part in position, said strapping band being secured at its ends to the housing and allowing the said removable part to be adjusted.

17. An auxiliary air controller of the character described for internal combustion engines having a power control throttle valve inserted in the induction pipe or manifold, comprising an auxiliary air valve adapted to open automatically against a load thereon under the influence of the vacuum created in the induction pipe when the engine is running, said load being automatically variable in dependence upon the adjustment of said power control throttle valve, a pendulum disk for producing said load, a housing enclosing said auxiliary valve and said pendulum disk, said housing comprising a removable part adjustably clamped thereto, said removable part being provided with a central opening for communication with an air cleaner and adapted to be mounted on either side of said housing, means for transmitting said load from said pendulum disk to said auxiliary valve, an arm for suspending said disk at an eccentric point thereof allowing it to swing in its own plane, said load transmitting means and said suspension arm being mounted in the removable part of said housing, and means for connecting said suspension arm with said throttle valve in a manner such that movement of said throttle valve in a direction of increasing opening position thereof causes a reduction of the load exerted by said pendulum means on said auxiliary valve allowing said auxiliary valve to move farther in its opening direction for the same increase of the vacuum within said induction pipe at a greater than at a less opening position of said throttle valve.

PER AXEL REINAR WEIERTZ.
LORENTZ KRISTIAN OLSSON.